(12) United States Patent
Lu

(10) Patent No.: US 10,129,049 B2
(45) Date of Patent: Nov. 13, 2018

(54) DATA TRANSMISSION METHOD AND MEDIA ACCESS CONTROLLER

(71) Applicant: Huawei Technologies Co., Ltd., Shenzhen (CN)

(72) Inventor: Yuchun Lu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 15/436,496

(22) Filed: Feb. 17, 2017

(65) Prior Publication Data
US 2017/0170985 A1 Jun. 15, 2017

Related U.S. Application Data

(63) Continuation of application No. PCT/CN2014/084826, filed on Aug. 20, 2014.

(51) Int. Cl.
*H04L 12/413* (2006.01)
*H04L 29/12* (2006.01)
*H04L 12/721* (2013.01)

(52) U.S. Cl.
CPC ............ *H04L 12/413* (2013.01); *H04L 45/66* (2013.01); *H04L 61/6022* (2013.01)

(58) Field of Classification Search
CPC .... H04L 12/413; H04L 45/66; H04L 61/6022
See application file for complete search history.

(56) References Cited

U.S. PATENT DOCUMENTS 7,957,391 B1 * 6/2011 Subramanian .......... H04L 5/003
370/394

2013/0083810 A1 4/2013 Ghiasi et al.
(Continued)

FOREIGN PATENT DOCUMENTS

| CN | 101854241 A | 10/2010 |
| CN | 103797742 A | 5/2014 |
| WO | 2006019501 A2 | 2/2006 |

OTHER PUBLICATIONS

"Part 3: Carrier Sense Multiple Access with Collision Detection (CSMA/CD) Access Method and Physical Layer Specifications; Amendment 4: Media Access Control Parameters, Physical Layers and Management Parameters for 40 Gb/s and 100 Gb/s Operation," IEEE Computer Society, Std 802.3ba, Institute of Electrical and Electronics Engineers, New York, New York, (Jun. 22, 2010).

*Primary Examiner* — Siming Liu
(74) *Attorney, Agent, or Firm* — Leydig, Voit & Mayer, Ltd.

(57) ABSTRACT

Embodiments provide a data transmission method, including: receiving, by a receiving circuit in a media access controller, N packets; generating, by a distributing circuit, a first data block and a second data block, where the first data block includes a first set, and the second data block includes a second set; distributing the first data block to a first circuit, and distributing the second data block to a second circuit; converting, by the first circuit, the first data block into first data, and converting, by the second circuit, the second data block into second data; and sending, by the first circuit, the first data through a first channel, and sending, by the second circuit, the second data through a second channel. In addition, another method and a corresponding media access controller are further provided. The foregoing technical solution helps reduce circuit resources occupied by an Ethernet interface.

20 Claims, 5 Drawing Sheets

(56) References Cited

U.S. PATENT DOCUMENTS

2014/0092918 A1  4/2014  Jost
2016/0094311 A1  3/2016  Su et al.

* cited by examiner

A receiving circuit in a MAC receives first data through a first channel, and the receiving circuit receives second data through a second channel       S202

The receiving circuit sends the first data to a first circuit in the MAC, and the receiving circuit sends the second data to a second circuit in the MAC       S204

The first circuit converts the first data into a first data block, and the second circuit converts the second data into a second data block       S206

The first circuit generates the first packet to the $M^{th}$ packet according to the first data block, and the second circuit generates the $(M+1)^{th}$ packet to the $N^{th}$ packet according to the second data block       S208

The first circuit sends the first packet to the $M^{th}$ packet to an aggregating circuit in the MAC       S210

The second circuit sends the $(M+1)^{th}$ packet to the $N^{th}$ packet to the aggregating circuit       S212

The aggregating circuit sequentially sends the N packets in a time sequence from the first packet to the $N^{th}$ packet       S214

DATA TRANSMISSION METHOD AND MEDIA ACCESS CONTROLLER

CROSS-REFERENCE TO RELATED APPLICATIONS

This application is a continuation of International Application No. PCT/CN2014/084826, filed on Aug. 20, 2014, the disclosure of which is hereby incorporated by reference in its entirety.

TECHNICAL FIELD

The present invention relates to the communications field, and more specifically, to a data transmission method and a media access controller (English: media access controller, MAC for short).

BACKGROUND

To support a requirement of multiple types of rates for an Ethernet interface, a transmit MAC (English: transmit media access controller, transmit MAC for short) in an existing high-speed Ethernet interface converts a packet flow into a data block flow, and distributes a data block in the data block flow to N virtual lanes (English: virtual lane, VL for short). For example, the multiple types of rates may be two types of rates. The two types of rates may respectively correspond to M0 bitstreams and M1 bitstreams. A value of N is a minimum common multiple of M0 and M1. After the data block flow is distributed to the N virtual lanes, an alignment marker (English: alignment marker, AM for short) needs to be inserted into each data block flow, and an AM of each lane includes an identifier of a virtual lane. After receiving the data block flow from the N virtual lanes, a transmit PMA (English: transmit physical medium attachment, transmit PMA for short) multiplexes the received data block flow into M bitstreams in a bit interleaved manner. After receiving the M bitstreams, a receive PMA (English: receive PMA) demultiplexes the bitstreams into N data block flows in a bit interleaved manner. A receive PCS (English: receive physical coding sublayer, receive PCS for short) performs alignment and reordering according to an alignment marker in the N data block flows. The PMA performs multiplexing and demultiplexing from N to M in a bit interleaved manner, and the N data block flows are out-of-order in a receive MAC (English: receive media access controller, receive MAC for short). That is, when a data block flow in the transmit MAC arrives at the receive MAC, the data block flow may exist in any data block flow of the N data block flows in the receive MAC. The receive PCS needs to perform reordering on the N data block flows to map data blocks in the N data block flows to the N virtual lanes. To implement the foregoing mapping, a full mesh (English: full mesh) needs to be established between the N virtual lanes by using a circuit, and the receive PCS needs to include N×(N−1) connections. In the foregoing technical solution, many circuit resources are occupied.

For example, to implement an Ethernet interface of 100 gigabits per second (gigabit per second, Gps for short), a 4×25 Gps solution and a 10×10 Gps solution are proposed in the industry. To support both the 4×25 Gps solution and the 10×10 Gps solution, the transmit MAC needs to convert a packet flow into a data block flow, and distribute the data block flow to 20 virtual lanes, where 20 is a minimum common multiple of 4 and 10.

After receiving a 4×25 Gps bitstream or a 10×10 Gps bitstream, the receive PMA demultiplexes the 4×25 Gps bitstream or the 10×10 Gps bitstream into 20 data block flows. The receive PCS performs reordering on data blocks in the 20 data block flows according to an identifier of a virtual lane in a data block. When performing the reordering, the receive PCS needs to map the data blocks in the 20 data block flows to the 20 virtual lanes. To implement the foregoing mapping, a full mesh needs to be established between the 20 virtual lanes by using a circuit (such as a logic circuit). Therefore, the receive PCS needs to include 20×19 connections.

SUMMARY

Embodiments of the present invention provide a data transmission method and a media access controller, which help reduce circuit resources occupied by an Ethernet interface.

According to a first aspect, a data transmission method is provided, including:

receiving, by a receiving circuit in a MAC, N packets, where the N packets sequentially arrive at the MAC in a time sequence from the first packet to the $N^{th}$ packet, and N is a positive integer greater than 1;

generating, by a distributing circuit in the MAC, a first data block and a second data block, where the first data block includes a first set, the first set includes the first packet to the $M^{th}$ packet, and the first packet to the $M^{th}$ packet are sequentially carried in the first data block in a location sequence from the first packet to the $M^{th}$ packet; the second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block includes a first identifier, the second data block includes a second identifier, the first identifier is used to indicate a time sequence that the first set arrives at the MAC, the second identifier is used to indicate a time sequence that the second set arrives at the MAC, M is a positive integer, and M is less than N;

distributing, by the distributing circuit, the first data block to a first circuit in the MAC, and distributing, by the distributing circuit, the second data block to a second circuit in the MAC;

converting, by the first circuit, the first data block into first data, and converting, by the second circuit, the second data block into second data; and sending, by the first circuit, the first data through a first channel, and sending, by the second circuit, the second data through a second channel.

In a first possible implementation manner of the first aspect, the first identifier is carried in an Ethernet interpacket gap (English: interpacket gap, IPG for short), a packet header of a packet, or a payload of a packet; or the second identifier is carried in an Ethernet IPG a packet header of a packet, or a payload of a packet.

According to the first aspect or the first possible implementation manner of the first aspect, in a second possible implementation manner of the first aspect, before the distributing, by the distributing circuit, the first data block to a first circuit in the MAC, the method further includes:

comparing, by a comparing circuit in the MAC, a length of a queue in a transmit buffer of the first circuit with a length of a queue in a transmit buffer of the second circuit; and determining, by the comparing circuit, that the length of the queue in the transmit buffer of the first circuit is less than or equal to the length of the queue in the transmit buffer of the second circuit; and the distributing, by the distributing circuit, the first data block to a first circuit in the MAC specifically includes:

distributing, by the distributing circuit, the first data block to the first circuit in the MAC based on determining by the comparing circuit that the length of the queue in the transmit buffer of the first circuit is less than or equal to the length of the queue in the transmit buffer of the second circuit.

According to the second possible implementation manner of the first aspect, in a third possible implementation manner of the first aspect, after the distributing, by the distributing circuit, the first data block to a first circuit in the MAC, and before the distributing, by the distributing circuit, the second data block to a second circuit in the MAC, the method further includes:

comparing, by the comparing circuit, the length of the queue in the transmit buffer of the first circuit with the length of the queue in the transmit buffer of the second circuit; and determining, by the comparing circuit, that the length of the queue in the transmit buffer of the second circuit is less than or equal to the length of the queue in the transmit buffer of the first circuit; and the distributing, by the distributing circuit, the second data block to a second circuit in the MAC specifically includes:

distributing, by the distributing circuit, the second data block to the second circuit in the MAC based on determining by the comparing circuit that the length of the queue in the transmit buffer of the second circuit is less than or equal to the length of the queue in the transmit buffer of the first circuit.

According to the first aspect, the first possible implementation manner of the first aspect, the second possible implementation manner of the first aspect, or the third possible implementation manner of the first aspect, in a fourth possible implementation manner of the first aspect, a difference between a maximum length of the first data block and a minimum length of the first data block is greater than or equal to a maximum length of a packet that can be received by the MAC; or a difference between a maximum length of the second data block and a minimum length of the second data block is greater than or equal to a maximum length of a packet that can be received by the MAC.

In the foregoing technical solution, after a receiving circuit in a transmit MAC receives N packets, the N packets are grouped into two sets, that is, a first set and a second set. A distributing circuit generates a first data block and a second data block that respectively include the first set and the second set. The distributing circuit respectively distributes the first data block and the second data block to a first circuit and a second circuit. The first circuit and the second circuit respectively convert the first data block and the second data block into first data and second data. That is, bandwidth corresponding to the N packets received by the receiving circuit is divided into bandwidth corresponding to the first set and bandwidth corresponding to the second set. The first set and the second set are respectively converted into the first data and the second data. Therefore, the bandwidth corresponding to the N packets is roughly equal to the sum of the bandwidth of the first data and the bandwidth of the second data.

The foregoing technical solution helps reduce circuit resources required by a receive MAC to separately perform reordering on the first data and the second data after receiving the first data and the second data.

Specifically, in the prior art, after the transmit MAC receives the N packets, the transmit MAC converts the N packets into one data flow. During a process of converting the N packets into the one data flow, the N packets are not grouped into the two sets. It is assumed that during the process of converting the N packets into the one data flow, the N packets are distributed to A virtual lanes. Therefore, in the prior art, after the receive MAC receives the one data flow, the receive MAC needs to include the A virtual lanes, thereby performing reordering on data block flows corresponding to the received one data flow. The receive MAC performs the reordering, and the A virtual lanes in the receive MAC need to be fully meshed. The receive MAC needs to include $A \times (A+1)$ connections.

In the foregoing technical solution provided in the embodiments of the present invention, after the transmit MAC receives the N packets, the N packets are grouped into the two sets. The first set and the second set are respectively converted into the first data and the second data. It is assumed that the bandwidth corresponding to the N packets is equal to the sum of the bandwidth of the first data and the bandwidth of the second data, and it is assumed that the bandwidth of the first data is equal to the bandwidth of the second data. During a process of converting the first set into the first data by the first circuit, the first set is distributed to A/2 virtual lanes. Similarly, during a process of converting the second set into the second data by the second circuit, the second set is distributed to A/2 virtual lanes. After the receive MAC receives the first data, the receive MAC needs to use A/2 virtual lanes to perform reordering on data block flows corresponding to the first data, and the A/2 virtual lanes correspond to $A/2 \times (A/2-1)$ connections. Similarly, after the receive MAC receives the second data, the receive MAC needs to use the other A/2 virtual lanes to perform reordering on data block flows corresponding to the second data, and the other A/2 virtual lanes also correspond to $A/2 \times (A/2-1)$ connections. Therefore, the receive MAC needs to include $A \times (A/2-1)$ connections.

It can be learned from the foregoing analysis that, in the prior art, a quantity of connections in the receive MAC is $A \times (A-1)$, and in the foregoing technical solution provided in the embodiments of the present invention, the quantity of connections may be $A \times (A/2-1)$.

In conclusion, the foregoing technical solution provided in the embodiments of the present invention helps reduce the quantity of connections in the receive MAC, and therefore, the foregoing technical solution helps reduce circuit resources occupied by an Ethernet interface.

According to a second aspect, a data transmission method is provided, including:

receiving, by a receiving circuit in a MAC, first data through a first channel, and receiving, by the receiving circuit, second data through a second channel;

sending, by the receiving circuit, the first data to a first circuit in the MAC, and sending, by the receiving circuit, the second data to a second circuit in the MAC;

converting, by the first circuit, the first data into a first data block, and converting, by the second circuit, the second data into a second data block, where the first data block includes a first set, the first set includes the first packet to the $M^{th}$ packet, and the first packet to the $M^{th}$ packet are sequentially carried in the first data block in a location sequence from the first packet to the $M^{th}$ packet; the second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block includes a first identifier, the second data block includes a second identifier, the first identifier is used to indicate a time sequence that a peer MAC generates the first data block, the second identifier is used to indicate a time sequence that the peer MAC generates the second data block, M is a positive integer, M is less than N, and N is a positive integer greater than 1;

generating, by the first circuit, the first packet to the $M^{th}$ packet according to the first data block, and generating, by the second circuit, the $(M+1)^{th}$ packet to the $N^{th}$ packet according to the second data block;

sending, by the first circuit, the first packet to the $M^{th}$ packet to an aggregating circuit in the MAC;

sending, by the second circuit, the $(M+1)^{th}$ packet to the $N^{th}$ packet to the aggregating circuit; and sequentially sending, by the aggregating circuit, the N packets in a time sequence from the first packet to the $N^{th}$ packet.

In a first possible implementation manner of the second aspect, the first identifier is carried in an Ethernet IPG, a packet header of a packet, or a payload of a packet; or the second identifier is carried in an Ethernet IPG, a packet header of a packet, or a payload of a packet.

According to the second aspect or the first possible implementation manner of the second aspect, in a second possible implementation manner of the second aspect, a difference between a maximum length of the first data block and a minimum length of the first data block is greater than or equal to a maximum length of a packet that can be generated by the MAC; or a difference between a maximum length of the second data block and a minimum length of the second data block is greater than or equal to a maximum length of a packet that can be generated by the MAC.

According to the second aspect, the first possible implementation manner of the second aspect, or the second possible implementation manner of the second aspect, in a third possible implementation manner of the second aspect, after the generating, by the first circuit, the first packet to the $M^{th}$ packet according to the first data block, and before the sending, by the first circuit, the first packet to the $M^{th}$ packet to an aggregating circuit in the MAC, the method further includes:

searching, by a searching circuit in the MAC, a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC is a component of the network device; and the sending, by the first circuit, the first packet to the $M^{th}$ packet to an aggregating circuit in the MAC specifically includes:

sending, by the first circuit, the at least one packet and the identifier of the first outbound interface to the aggregating circuit.

According to the second aspect, the first possible implementation manner of the second aspect, or the second possible implementation manner of the second aspect, in a fourth possible implementation manner of the second aspect, after the sending, by the first circuit, the first packet to the $M^{th}$ packet to an aggregating circuit in the MAC, the method further includes:

searching, by a searching circuit in the aggregating circuit, a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC is a component of the network device; and the sending, by the aggregating circuit, the N packets specifically includes:

sending, by the aggregating circuit, the at least one packet to the first outbound interface.

In the forgoing technical solution, after a receiving circuit in a receive MAC receives first data and second data, the first data is converted into a first data block, and the second data is converted into a second data block. The first data block includes a first set, and the second data block includes a second set. Then, the first data block is converted into the first packet to the $M^{th}$ packet, and the second data block is converted into the $(M+1)^{th}$ packet to the $N^{th}$ packet. Therefore, bandwidth corresponding to the N packets is roughly equal to the sum of bandwidth of the first data and bandwidth of the second data.

The foregoing technical solution helps reduce circuit resources required by the receive MAC to separately perform reordering on the first data and the second data after receiving the first data and the second data.

Specifically, in the prior art, after a transmit MAC receives the N packets, the transmit MAC converts the N packets into one data flow. During a process of converting the N packets into the one data flow, the N packets are not grouped into the two sets. It is assumed that during the process of converting the N packets into the one data flow, the N packets are distributed to A virtual lanes. Therefore, in the prior art, after the receive MAC receives the one data flow, the receive MAC needs to include the A virtual lanes, thereby performing reordering on data block flows corresponding to the received one data flow. The receive MAC performs the reordering, and the A virtual lanes in the receive MAC need to be fully meshed. The receive MAC needs to include $A \times (A+1)$ connections.

In the foregoing technical solution provided in the embodiments of the present invention, after the receive MAC receives the first data, the receive MAC needs to use A/2 virtual lanes to perform reordering on data block flows corresponding to the first data, and the A/2 virtual lanes correspond to $A/2 \times (A/2-1)$ connections. Similarly, after the receive MAC receives the second data, the receive MAC needs to use the other A/2 virtual lanes to perform reordering on data block flows corresponding to the second data, and the other A/2 virtual lanes also correspond to $A/2 \times (A/2-1)$ connections. Therefore, the receive MAC needs to include $A \times (A/2-1)$ connections.

It can be learned from the foregoing analysis that, in the prior art, a quantity of connections in the receive MAC is $A \times (A-1)$, and in the foregoing technical solution provided in the embodiments of the present invention, the quantity of connections may be $A \times (A/2-1)$.

In conclusion, the foregoing technical solution provided in the embodiments of the present invention helps reduce the quantity of connections in the receive MAC, and therefore, the foregoing technical solution helps reduce circuit resources occupied by an Ethernet interface.

According to a third aspect, a MAC is provided, including a receiving circuit, a distributing circuit, a first circuit, and a second circuit; where:

the receiving circuit is configured to receive N packets, where the N packets sequentially arrive at the MAC in a time sequence from the first packet to the $N^{th}$ packet, and N is a positive integer greater than 1;

the distributing circuit is configured to generate a first data block and a second data block, where the first data block includes a first set, the first set includes the first packet to the $M^{th}$ packet, and the first packet to the $M^{th}$ packet are sequentially carried in the first data block in a location sequence from the first packet to the $M^{th}$ packet; the second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block includes a first identifier, the second data block includes a second identifier, the first identifier is used to indicate a time sequence that the first set arrives at the MAC, the second identifier is used to indicate a time sequence that the second set arrives at the MAC, M is a positive integer, and M is less than N;

the distributing circuit is further configured to distribute the first data block to the first circuit and distribute the second data block to the second circuit;

the first circuit is configured to convert the first data block into first data;

the second circuit is configured to convert the second data block into second data;

the first circuit is further configured to send the first data through a first channel; and the second circuit is further configured to send the second data through a second channel.

In a first possible implementation manner of the third aspect, the first identifier is carried in an Ethernet IPG, a packet header of a packet, or a payload of a packet; or the second identifier is carried in an Ethernet interpacket gap IPG, a packet header of a packet, or a payload of a packet.

According to the third aspect or the first possible implementation manner of the third aspect, in a second possible implementation manner of the third aspect, the MAC further includes a comparing circuit, where:

the comparing circuit is configured to: before the distributing circuit distributes the first data block to the first circuit in the MAC, compare a length of a queue in a transmit buffer of the first circuit with a length of a queue in a transmit buffer of the second circuit; and determine that the length of the queue in the transmit buffer of the first circuit is less than or equal to the length of the queue in the transmit buffer of the second circuit; and the distributing circuit is specifically configured to distribute the first data block to the first circuit in the MAC based on determining by the comparing circuit that the length of the queue in the transmit buffer of the first circuit is less than or equal to the length of the queue in the transmit buffer of the second circuit.

According to the second possible implementation manner of the third aspect, in a third possible implementation manner of the third aspect, the comparing circuit is further configured to: after the distributing circuit distributes the first data block to the first circuit in the MAC, and before the distributing circuit distributes the second data block to the second circuit in the MAC, compare the length of the queue in the transmit buffer of the first circuit with the length of the queue in the transmit buffer of the second circuit; and determine that the length of the queue in the transmit buffer of the second circuit is less than or equal to the length of the queue in the transmit buffer of the first circuit; and the distributing circuit is specifically configured to distribute the second data block to the second circuit in the MAC based on determining by the comparing circuit that the length of the queue in the transmit buffer of the second circuit is less than or equal to the length of the queue in the transmit buffer of the first circuit.

According to the third aspect, the first possible implementation manner of the third aspect, the second possible implementation manner of the third aspect, or the third possible implementation manner of the third aspect, in a fourth possible implementation manner of the third aspect, a difference between a maximum length of the first data block and a minimum length of the first data block is greater than or equal to a maximum length of a packet that can be received by the MAC; or a difference between a maximum length of the second data block and a minimum length of the second data block is greater than or equal to a maximum length of a packet that can be received by the MAC.

According to a fourth aspect, a MAC is provided, including a receiving circuit, a first circuit, a second circuit, and an aggregating circuit; where:

the receiving circuit is configured to receive first data through a first channel and receive second data through a second channel;

the receiving circuit is further configured to send the first data to the first circuit and send the second data to the second circuit;

the first circuit is configured to convert the first data into a first data block, where the first data block includes a first set, the first set includes the first packet to the $M^{th}$ packet, and the first packet to the $M^{th}$ packet are sequentially carried in the first data block in a location sequence from the first packet to the $M^{th}$ packet; the first data block includes a first identifier, and the first identifier is used to indicate a time sequence that a peer MAC generates the first data block;

the second circuit is configured to convert the second data into a second data block, where the second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the second data block includes a second identifier, and the second identifier is used to indicate a time sequence that the peer MAC generates the second data block, M is a positive integer, M is less than N, and N is a positive integer greater than 1;

the first circuit is further configured to generate the first packet to the $M^{th}$ packet according to the first data block;

the second circuit is further configured to generate the $(M+1)^{th}$ packet to the $N^{th}$ packet according to the second data block;

the first circuit is further configured to send the first packet to the $M^{th}$ packet to the aggregating circuit;

the second circuit is further configured to send the $(M+1)^{th}$ packet to the $N^{th}$ packet to the aggregating circuit; and the aggregating circuit is configured to sequentially send the N packets in a time sequence from the first packet to the $N^{th}$ packet.

In a first possible implementation manner of the fourth aspect, the first identifier is carried in an Ethernet IPG, a packet header of a packet, or a payload of a packet; or the second identifier is carried in an Ethernet IPG, a packet header of a packet, or a payload of a packet.

According to the fourth aspect or the first possible implementation manner of the fourth aspect, in a second possible implementation manner of the fourth aspect, a difference between a maximum length of the first data block and a minimum length of the first data block is greater than or equal to a maximum length of a packet that can be generated by the MAC; or a difference between a maximum length of the second data block and a minimum length of the second data block is greater than or equal to a maximum length of a packet that can be generated by the MAC.

According to the fourth aspect, the first possible implementation manner of the fourth aspect, or the second possible implementation manner of the fourth aspect, in a third possible implementation manner of the fourth aspect, the MAC further includes a searching circuit, where:

the searching circuit is configured to: after the first circuit generates the first packet to the $M^{th}$ packet according to the first data block, and before the first circuit sends the first packet to the $M^{th}$ packet to the aggregating circuit, search a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC is a component of the network device; and the first circuit is specifically configured to send the at least one packet and the identifier of the first outbound interface to the aggregating circuit.

According to the fourth aspect, the first possible implementation manner of the fourth aspect, or the second possible implementation manner of the fourth aspect, in a fourth possible implementation manner of the fourth aspect, the aggregating circuit further includes a searching circuit, where:

the searching circuit is configured to: after the first circuit sends the first packet to the $M^{th}$ packet to the aggregating circuit, search a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC is a component of the network device; and the aggregating circuit is specifically configured to send the at least one packet to the first outbound interface.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 2 is a schematic flowchart of a data transmission method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
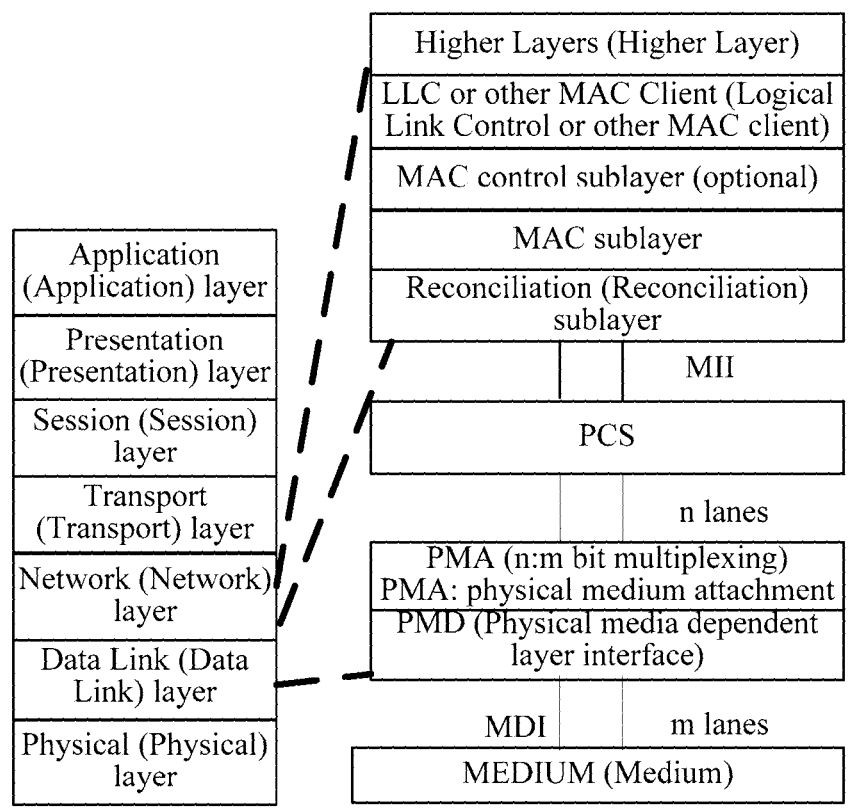
FIG. 1 is a schematic diagram of the Open Systems Interconnection architecture in the prior art.

FIG. 1 is a schematic diagram of the Open Systems Interconnection architecture. The technical solutions provided in the embodiments of the present invention are mainly implemented at a physical (English: Physical) layer and a data link (English: Data Link) layer in the Open Systems Interconnection architecture shown in FIG. 1. As shown in FIG. 1, the physical layer may include a reconciliation sublayer (English: Reconciliation Sublayer, RS for short), a PCS sublayer, a PMA sublayer, and a physical media dependent (English: Physical Media Dependent, PMD for short) sublayer. The data link layer may include a MAC sublayer, a logical link control (English: Logical Link Control, LLC for short) sublayer or another MAC client (English: MAC Client).

Figure 1A:
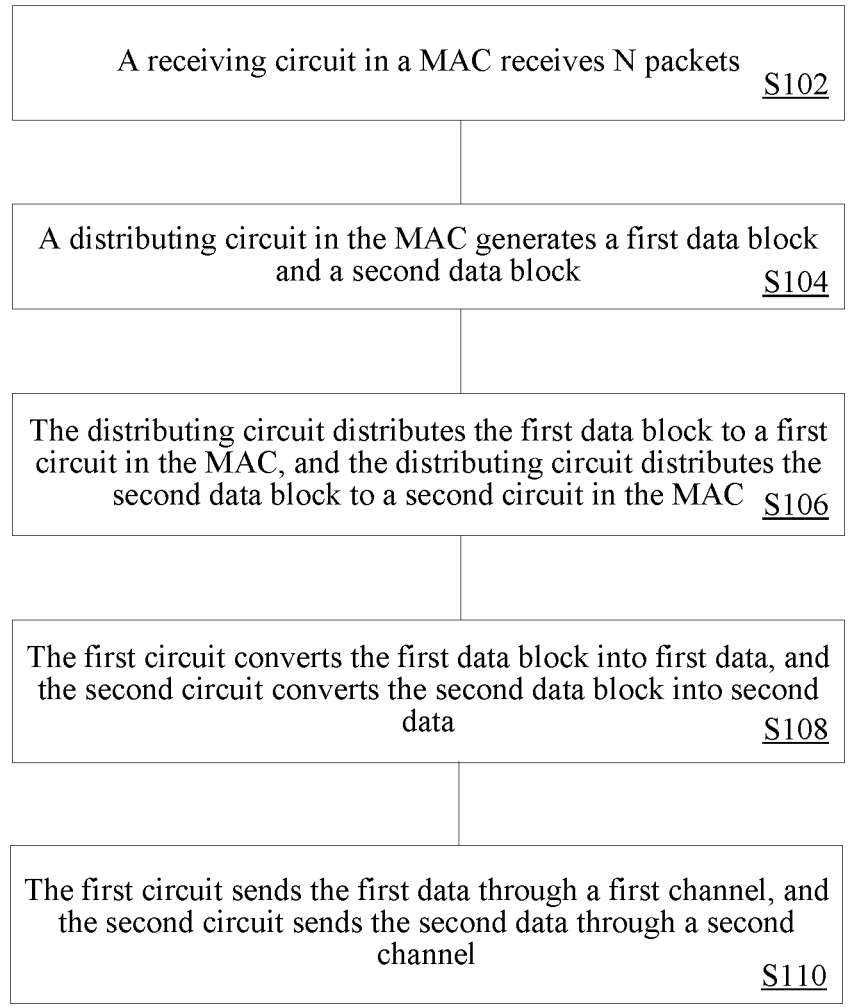
FIG. 1a is a schematic flowchart of a data transmission method according to an embodiment of the present invention.

FIG. 1a is a schematic flowchart of a data transmission method according to an embodiment of the present invention. The method is executed by a MAC. The MAC may be an entity of the MAC sublayer shown in FIG. 1. The MAC may be a MAC ship (MAC chip), a system chip (system chip), or a multi-port Ethernet device (multi-port Ethernet device).

For example, the MAC may be implemented by using a field programmable gate array (English: field programmable gate array, FPGA for short) or an application-specific integrated circuit (English: application-specific integrated circuit, ASIC for short). The MAC may be a component of a network interface card (Network Interface Card, NIC). The NIC may be a line card (Line Card) or a PIC (Physical Interface Card, physical interface card). The MAC may include a Media-Independent Interface (Media Independent Interface, MII) for interfacing to (for interfacing to) a physical layer circuit (English: PHY).

For example, the MAC chip may include multiple MACs. The MAC chip may be implemented by using an FPGA or an ASIC.

The system chip may include multiple MACs and multiple PHYs. The system chip may be implemented by using an FPGA or an ASIC.

The multi-port Ethernet device may include the MAC chip or the system chip. For example, the multi-port Ethernet device may be a router, a network switch, a packet transport network (English: packet transport network, PTN for short) device, a firewall, a load balancer, a data center, or a wavelength-division multiplexing (English: wavelength-division multiplexing, WDM for short) device. For example, the network switch may be an OpenFlow switch (English: OpenFlow Switch).

Referring to FIG. 1a, the method includes the following steps:

S102. A receiving circuit in a MAC receives N packets.

The N packets sequentially arrive at the MAC in a time sequence from the first packet to the $N^{th}$ packet, and N is a positive integer greater than 1.

For example, the N packets may be sent by a network processor (English: network processor, NP for short) or a traffic management (English: traffic management, TM for short) chip. The NP or the TM chip is coupled with the MAC.

For example, the N packets may be packets of a layer 2 protocol, packets of a layer 2.5 protocol, packets of a layer 3 protocol, or packets of a layer 4 protocol. For example, the layer 2 protocol may be the Media Access Control (English: media access control) protocol. The layer 2.5 protocol may be the Multiprotocol Label Switching (English: multiprotocol label switching, MPLS for short) protocol. The layer 3 protocol may be the Internet Protocol (English: internet protocol, IP for short). The layer 4 protocol may be the Transmission Control Protocol (English: transmission control protocol, TCP for short). For layer 2, layer 2.5, layer 3, or layer 4, refer to the Open Systems Interconnection reference model (English: open system interlink reference model).

For example, N may be equal to 2, 3, 4, or 5.

S104. A distributing circuit in the MAC generates a first data block and a second data block.

The first data block includes a first set, the first set includes the first packet to the $M^{th}$ packet, and the first packet to the $M^{th}$ packet are sequentially carried in the first data block in a location sequence from the first packet to the $M^{th}$ packet. The second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet. The first data block includes a first identifier, the second data block includes a second identifier, the first identifier is used to indicate a time sequence that the first set arrives at the MAC, the second identifier is used to indicate a time sequence that the second set arrives at the MAC, M is a positive integer, and M is less than N.

For example, M may be equal to 1, 2, or 3.

A person skilled in the art may understand that when M is equal to 1, the first packet is the same as the $M^{th}$ packet, and the first packet to the $M^{th}$ packet include only the first packet. That the first packet to the $M^{th}$ packet are sequentially carried in the first data block in the location sequence from the first packet to the $M^{th}$ packet is specifically as follows: The first packet is carried in the first data block.

For example, M+1 may be equal to N.

A person skilled in the art may understand that when M+1 is equal to N, the $(M+1)^{th}$ packet is the same as the $N^{th}$ packet, and the $(M+1)^{th}$ packet to the $N^{th}$ packet include only the $N^{th}$ packet. That the $(M+1)^{th}$ packet to the $N^{th}$ packet are sequentially carried in the second data block in the location sequence from the $(M+1)^{th}$ packet to the $N^{th}$ packet is specifically as follows: The $N^{th}$ packet is carried in the second data block.

The first set includes at least one packet, and the second set includes at least one packet.

The first identifier and the second identifier are used to indicate that the first set arrives at the MAC prior to the second set. It may be understood that, that the first set arrives at the MAC prior to the second set means that each packet in the first set arrives at the MAC prior to each packet in the second set.

For example, the first identifier and the second identifier may be a sequence number (English: sequence number, SN for short). For example, the MAC may allocate a smaller SN to a set that arrives at the MAC at an earlier time, and allocate a larger SN to a set that arrives at the MAC at a later time. For example, the first identifier and the second identifier may be respectively 1 and 2.

S106. The distributing circuit distributes the first data block to a first circuit in the MAC, and the distributing circuit distributes the second data block to a second circuit in the MAC.

For example, the distributing circuit may distribute the first data block and the second data block in a weighted round robin (English: Weighted Round-Robin, WRR for short) manner.

S108. The first circuit converts the first data block into first data, and the second circuit converts the second data block into second data.

For example, the first circuit includes a physical layer coding circuit, and the first data is data that is obtained after physical layer coding is performed on the first data block. Alternatively, the first circuit includes a physical layer coding circuit and a scrambling circuit, and the first data is data that is obtained after physical layer coding and scrambling are performed on the first data block. Alternatively, the first circuit includes a physical layer coding circuit, a scrambling circuit, and an alignment marker inserting circuit, and the first data is data that is obtained after physical layer coding, scrambling, and alignment marker insertion are performed on the first data block.

For example, the second circuit includes a physical layer coding circuit, and the second data is data that is obtained after physical layer coding is performed on the second data block. Alternatively, the second circuit includes a physical layer coding circuit and a scrambling circuit, and the second data is data that is obtained after physical layer coding and scrambling are performed on the second data block. Alternatively, the second circuit includes a physical layer coding circuit, a scrambling circuit, and an alignment marker inserting circuit, and the second data is data that is obtained after physical layer coding, scrambling, and alignment marker insertion are performed on the second data block.

For example, the physical layer coding may be 4b/5b encoding, 8b/10b encoding, 64b/66b encoding, or physical layer coding of another type. For details about the alignment marker, refer to the Institute of Electrical and Electronics Engineers (English: Institute of Electrical and Electronics Engineers, IEEE for short) 802.3.

S110. The first circuit sends the first data through a first channel, and the second circuit sends the second data through a second channel.

For example, a rate at which the first circuit sends the first data may be equal to a rate of a standard Ethernet interface. For example, the rate at which the first circuit sends the first data may be 100 megabits per second (English: megabit per second, Mbps for short), 1 Gbps, 10 Gbps, 40 Gbps, 100 Gbps, 400 Gbps, or 1 terabit per second (English: terabit per second, Tbps for short).

It may be understood that in the foregoing technical solution, the MAC may be a transmit MAC. In specific implementation of S110, the first circuit in the transmit MAC may send the first data to a receive MAC, and the second circuit in the transmit MAC may send the second data to the receive MAC.

It may be understood that, from a perspective of an execution body of the method shown in FIG. 1a, that is, the MAC, the receive MAC is a peer MAC.

For example, the first channel and the second channel may be implemented by using different optical transport network (English: optical transport network, OTN for short) timeslots, different synchronous digital hierarchy (English: synchronous digital hierarchy, SDH) timeslots, different wavelengths, or different optical fibers.

For example, the MAC is connected to the peer MAC by using a cable. The first channel and the second channel are carried in the cable, and the first channel and the second channel occupy different SDH timeslots.

For example, the MAC is connected to the peer MAC by using an optical fiber. Specifically, the MAC is coupled with a first optical module, and the peer MAC is coupled with a second optical module. A transmit end (TX) of the first optical module is connected to one end of the optical fiber, and a receive end (RX) of the second optical module is connected to the other end of the optical fiber. The first channel and the second channel are carried in the optical fiber, and the first channel and the second channel occupy different wavelengths.

For example, the MAC is a component of a first network device, and the peer MAC is a component of a second network device. For example, the first network device is a first router, and the MAC is a component of an LC in the first router. The second network device is a second router, and the peer MAC is a component of an LC in the second router. The first router is connected to the second router by using an optical fiber. It may be understood that a path from the first router to the second router may include another network device, or may not include another network device.

Optionally, in the foregoing technical solution, the first identifier is carried in an Ethernet IPG, a packet header of a packet, or a payload of a packet.

For example, the first identifier may be carried in a packet that is sent prior to the first packet, and the packet that is sent prior to the first packet may be an interpacket gap.

Alternatively, the first identifier may be carried in a packet header or a payload of any packet of the first packet to the $M^{th}$ packet.

Optionally, in the foregoing technical solution, the second identifier is carried in an Ethernet interpacket gap IPG, a packet header of a packet, or a payload of a packet.

For example, the second identifier may be carried in a packet that is sent prior to the $(M+1)^{th}$ packet, and the packet that is sent prior to the $(M+1)^{th}$ packet may be an interpacket gap.

Alternatively, the second identifier may be carried in a packet header or a payload of any packet of the $(M+1)^{th}$ packet to the $N^{th}$ packet.

Optionally, in the foregoing technical solution, before that the distributing circuit distributes the first data block to a first circuit in the MAC, the method further includes:

comparing, by a comparing circuit in the MAC, a length of a queue in a transmit buffer (transmit buffer) of the first circuit with a length of a queue in a transmit buffer of the second circuit; and determining, by the comparing circuit, that the length of the queue in the transmit buffer of the first circuit is less than or equal to the length of the queue in the transmit buffer of the second circuit.

That the distributing circuit distributes the first data block to a first circuit in the MAC specifically includes:

distributing, by the distributing circuit, the first data block to the first circuit in the MAC based on determining by the comparing circuit that the length of the queue in the transmit buffer of the first circuit is less than or equal to the length of the queue in the transmit buffer of the second circuit.

For example, the transmit buffer of the first circuit is used to save to-be-sent data. Specifically, the transmit buffer of the first circuit may maintain a first in first out (English: first in first out, FIFO for short) queue. Specifically, before the first circuit sends the first data through the first channel, the first data may be located in the FIFO queue that is maintained by the transmit buffer of the first circuit.

For example, the transmit buffer of the second circuit is used to save to-be-sent data. Specifically, the transmit buffer of the second circuit may maintain an FIFO queue. Specifically, before the second circuit sends the second data through the second channel, the second data may be located in the FIFO queue that is maintained by the transmit buffer of the second circuit.

A length of a queue in a transmit buffer of a circuit may be used to indicate a situation in which circuit resources are occupied. A longer queue indicates that more circuit resources are occupied, and a shorter queue indicates that less circuit resources are occupied. A data block is distributed to a circuit with a shorter queue, which helps implement load balancing.

Optionally, in the foregoing technical solution, after that the distributing circuit distributes the first data block to a first circuit in the MAC, and before that the distributing circuit distributes the second data block to a second circuit in the MAC, the method further includes:

comparing, by the comparing circuit, the length of the queue in the transmit buffer of the first circuit with the length of the queue in the transmit buffer of the second circuit; and determining, by the comparing circuit, that the length of the queue in the transmit buffer of the second circuit is less than or equal to the length of the queue in the transmit buffer of the first circuit.

That the distributing circuit distributes the second data block to a second circuit in the MAC specifically includes:

distributing, by the distributing circuit, the second data block to the second circuit in the MAC based on determining by the comparing circuit that the length of the queue in the transmit buffer of the second circuit is less than or equal to the length of the queue in the transmit buffer of the first circuit.

It may be understood that a length of a queue in a transmit buffer may change over time. For example, after an enqueue operation is performed on the queue in the transmit buffer, the length of the queue may increase, and after a dequeue operation is performed on the queue in the transmit buffer, the length of the queue may decrease. In the foregoing technical solution, after the first data block is distributed to the first circuit, the length of the queue in the transmit buffer in the first circuit may increase. Therefore, the length of the queue in the transmit buffer of the first circuit may be greater than the length of the queue in the transmit buffer of the second circuit.

Optionally, in the foregoing technical solution, a difference between a maximum length of the first data block and a minimum length of the first data block is greater than or equal to a maximum length of a packet that can be received by the MAC.

Optionally, in the foregoing technical solution, a difference between a maximum length of the second data block and a minimum length of the second data block is greater than or equal to a maximum length of a packet that can be received by the MAC.

FIG. 2 is a schematic flowchart of a data transmission method according to an embodiment of the present invention. The method is executed by a MAC, and the MAC may be a MAC chip, a system chip, or a multi-port Ethernet device. For the MAC chip, the system chip, and the multi-port Ethernet device, refer to the description of the embodiment shown in FIG. 1. Details are not described herein again. It should be noted that the MAC in the embodiment shown in FIG. 1 may be a transmit MAC, and the MAC in the embodiment shown in FIG. 2 may be a receive MAC. The transmit MAC and the receive MAC may form a data transmitting and receiving system. Specifically, the receive MAC may be used to receive data sent by the transmit MAC.

Referring to FIG. 2, the method includes the following steps:

S202. A receiving circuit in a MAC receives first data through a first channel, and the receiving circuit receives second data through a second channel.

It may be understood that, from a perspective of an execution body of the method shown in FIG. 2, that is, the MAC, the MAC shown in FIG. 1 is a peer MAC. For example, the first data and the second data may be sent by the peer MAC.

For example, the first channel and the second channel may be implemented by using different OTN timeslots, different synchronous SDH timeslots, different wavelengths, or different optical fibers.

For example, the MAC is connected to the peer MAC by using a cable. The first channel and the second channel are carried in the cable, and the first channel and the second channel occupy different SDH timeslots.

For example, the MAC is connected to the peer MAC by using an optical fiber. Specifically, the MAC is coupled with a first optical module, and the peer MAC is coupled with a second optical module. A transmit end of the second optical module is connected to one end of the optical fiber, and a receive end of the first optical module is connected to the other end of the optical fiber. The first channel and the second channel are carried in the optical fiber, and the first channel and the second channel occupy different wavelengths.

For example, the MAC is a component of a first network device, and the peer MAC is a component of a second network device. For example, the first network device is a first router, and the MAC is a component of an LC in the first router. The second network device is a second router, and the peer MAC is a component of an LC in the second router. The first router is connected to the second router by using an optical fiber. It may be understood that a path from the first router to the second router may include another network device, or may not include another network device.

For example, the first data may be data that is obtained after physical layer coding is performed, or data that is obtained after physical layer coding and scrambling are performed, or data that is obtained after physical layer coding, scrambling, and alignment marker insertion are performed.

For example, the second data may be data that is obtained after physical layer coding is performed, or data that is obtained after physical layer coding and scrambling are performed, or data that is obtained after physical layer coding, scrambling, and alignment marker insertion are performed.

S204. The receiving circuit sends the first data to a first circuit in the MAC, and the receiving circuit sends the second data to a second circuit in the MAC.

For example, if the first data is the data that is obtained after the physical layer coding, the scrambling, and the alignment marker insertion are performed, the first circuit may include an alignment marker elimination circuit, a descrambling circuit, and a physical layer decoding circuit. Alternatively, if the first data is the data that is obtained after the physical layer coding and the scrambling are performed, the first circuit may include a descrambling circuit and a physical layer decoding circuit. Alternatively, if the first data is the data that is obtained after the physical layer coding is performed, the first circuit may include a physical layer decoding circuit.

For example, if the second data is the data that is obtained after the physical layer coding, the scrambling, and the alignment marker insertion are performed, the second circuit may include an alignment marker elimination circuit, a descrambling circuit, and a physical layer decoding circuit. Alternatively, if the second data is the data that is obtained after the physical layer coding and the scrambling are performed, the second circuit may include a descrambling circuit and a physical layer decoding circuit. Alternatively, if the second data is the data that is obtained after the physical layer coding is performed, the second circuit may include a physical layer decoding circuit.

For example, the physical layer coding may be 4b/5b encoding, 8b/10b encoding, 64b/66b encoding, or physical layer coding of another type. The physical layer decoding may be 5b/4b decoding, 10b/8b decoding, 66b/64b decoding, or physical layer decoding of another type. For details about the alignment marker, refer to the IEEE 802.3.

S206. The first circuit converts the first data into a first data block, and the second circuit converts the second data into a second data block.

The first data block includes a first set, the first set includes the first packet to the $M^{th}$ packet, and the first packet to the $M^{th}$ packet are sequentially carried in the first data block in a location sequence from the first packet to the $M^{th}$ packet. The second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet. The first data block includes a first identifier, the second data block includes a second identifier, the first identifier is used to indicate a time sequence that the peer MAC generates the first data block, the second identifier is used to indicate a time sequence that the peer MAC generates the second data block, M is a positive integer, M is less than N, and N is a positive integer greater than 1.

For example, M may be equal to 1, 2, or 3.

A person skilled in the art may understand that when M is equal to 1, the first packet is the same as the $M^{th}$ packet, and the first packet to the $M^{th}$ packet include only the first packet. That the first packet to the $M^{th}$ packet are sequentially carried in the first data block in the location sequence from the first packet to the $M^{th}$ packet is specifically as follows: The first packet is carried in the first data block.

For example, M+1 may be equal to N.

A person skilled in the art may understand that when M+1 is equal to N, the $(M+1)^{th}$ packet is the same as the $N^{th}$ packet, and the $(M+1)^{th}$ packet to the $N^{th}$ packet include only the $N^{th}$ packet. That the $(M+1)^{th}$ packet to the $N^{th}$ packet are sequentially carried in the second data block in the location sequence from the $(M+1)^{th}$ packet to the $N^{th}$ packet is specifically as follows: The $N^{th}$ packet is carried in the second data block.

The first set includes at least one packet, and the second set includes at least one packet.

The first identifier and the second identifier are used to indicate that a time at which the peer MAC generates the first data block is earlier than a time at which the peer MAC generates the second data block.

For example, the first identifier and the second identifier may be SNs. For example, the peer MAC may allocate a smaller SN to a data block generated at an earlier time, and allocate a larger SN to a data block generated at a later time. For example, the first identifier and the second identifier may be respectively 1 and 2.

S208. The first circuit generates the first packet to the $M^{th}$ packet according to the first data block, and the second circuit generates the $(M+1)^{th}$ packet to the $N^{th}$ packet according to the second data block.

For example, the N packets may be packets of a layer 2 protocol, packets of a layer 2.5 protocol, packets of a layer 3 protocol, or packets of a layer 4 protocol. For example, the layer 2 protocol may be the Media Access Control protocol, the layer 2.5 protocol may be the MPLS protocol, the layer 3 protocol may be IP, and the layer 4 protocol may be TCP. For layer 2, layer 2.5, layer 3, or layer 4, refer to the Open Systems Interconnection reference model.

For example, N may be equal to 2, 3, 4, or 5.

S210. The first circuit sends the first packet to the $M^{th}$ packet to an aggregating circuit in the MAC.

S212. The second circuit sends the $(M+1)^{th}$ packet to the $N^{th}$ packet to the aggregating circuit.

For example, in specific implementation, S210 may further include: sending, by the first circuit, the first identifier to the aggregating circuit. In specific implementation, S212 may further include: sending, by the second circuit, the second identifier to the aggregating circuit.

The execution body of the method shown in FIG. 2 may perform S210 first, and then perform S212. Alternatively, the execution body may perform S212 first, and then perform S210. Alternatively, the execution body may perform S210 and S212 at the same time.

S214. The aggregating circuit sequentially sends the N packets in a time sequence from the first packet to the $N^{th}$ packet.

For example, in specific implementation of S214, the aggregating circuit determines, according to the first identifier and the second identifier, that a time at which the peer MAC generates the first data block is earlier than a time at which the peer MAC generates the second data block. The aggregating circuit determines that the first packet to the $M^{th}$ need to be sent prior to the $(M+1)^{th}$ packet to the $N^{th}$ packet.

For example, the aggregating circuit may send the N packets to an NP or a TM chip, and the NP or the TM chip is coupled with the MAC.

Optionally, in the foregoing technical solution, the first identifier is carried in an Ethernet IPG, a packet header of a packet, or a payload of a packet.

For example, the first identifier may be carried in a packet that is sent prior to the first packet, and the packet that is sent prior to the first packet may be an interpacket gap.

Alternatively, the first identifier may be carried in a packet header or a payload of any packet of the first packet to the $M^{th}$ packet.

Optionally, in the foregoing technical solution, the second identifier is carried in an Ethernet IPG, a packet header of a packet, or a payload of a packet.

For example, the second identifier may be carried in a packet that is sent prior to the $(M+1)^{th}$ packet, and the packet that is sent prior to the $(M+1)^{th}$ packet may be an interpacket gap.

Alternatively, the first identifier may be carried in a packet header or a payload of any packet of the $(M+1)^{th}$ packet to the $N^{th}$ packet.

Optionally, in the foregoing technical solution, a difference between a maximum length of the first data block and a minimum length of the first data block is greater than or equal to a maximum length of a packet that can be received by the MAC.

Optionally, in the foregoing technical solution, a difference between a maximum length of the second data block and a minimum length of the second data block is greater than or equal to a maximum length of a packet that can be received by the MAC.

Optionally, in the foregoing technical solution, after that the first circuit generates the first packet to the $M^{th}$ packet according to the first data block, and before that the first circuit sends the first packet to the $M^{th}$ packet to an aggregating circuit in the MAC, the method further includes:

searching, by a searching circuit in the MAC, a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC is a component of the network device.

That the first circuit sends the first packet to the $M^{th}$ packet to an aggregating circuit in the MAC specifically includes:

sending, by the first circuit, the at least one packet and the identifier of the first outbound interface to the aggregating circuit.

For example, after receiving the at least one packet and the identifier of the first outbound interface, the aggregating circuit may send the at least one packet and the identifier of the first outbound interface to the NP or the TM. After the NP or the TM receives the at least one packet and the identifier of the first outbound interface, the NP or the TM may determine, based on the identifier of the first outbound interface, that an operation (by the NP) of searching a forwarding table performed for the at least one packet or an operation (by the TM) of traffic management performed for the at least one packet is avoided. The NP or the TM sends the at least one packet to the first outbound interface, or the NP or the TM sends the at least one packet and the identifier of the first outbound interface to a fabric interface controller (English: fabric interface controller, FIC for short). After receiving the at least one packet, the FIC may process the at least one packet into multiple cells in a switch fabric.

In the foregoing technical solution, after receiving the at least one packet, the NP or the TM does not perform the operation (by the NP) of searching a forwarding table or the operation (by the TM) of traffic management for the at least one packet. In the prior art, after receiving the packet, the NP or the TM needs to perform the operation of searching a forwarding table or perform the operation of traffic management for the received packet. Therefore, the foregoing technical solution is equivalent to bypassing (English: bypass) the NP or the TM, which helps reduce resources occupied by the NP or the TM and improves packet processing efficiency. The forwarding table may be a routing table or a Media Access Control table.

Figure 2A:
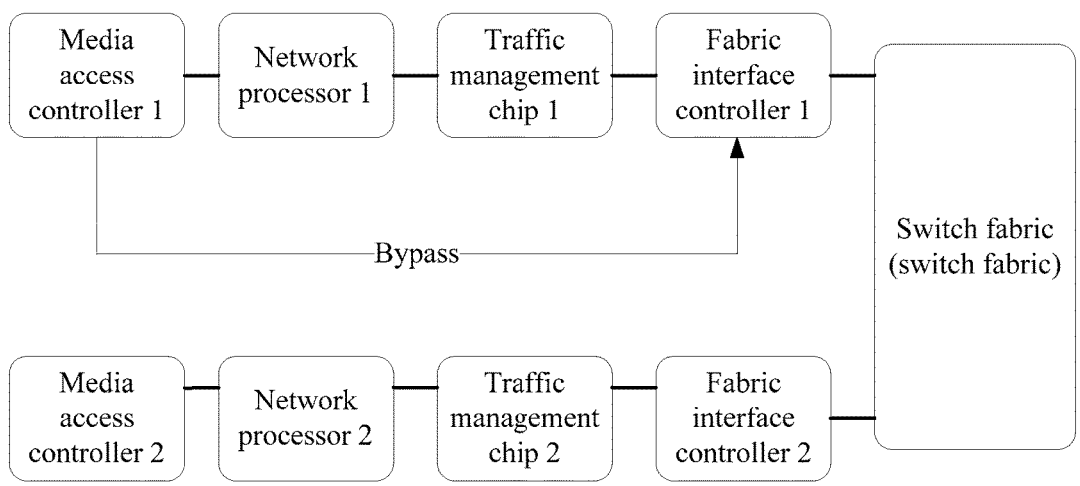
FIG. 2a is a schematic diagram of an application scenario according to an embodiment of the present invention.

FIG. 2a is a schematic diagram of an application scenario of the foregoing technical solution. FIG. 2a is a schematic diagram of a network switch. The network switch includes a MAC 1, an NP 1, a TM 1, a FIC 1, a switch fabric, a FIC 2, a TM 2, an NP 2, and a MAC 2, where the MAC 1 corresponds to an Ethernet interface of the network switch, and the MAC 2 corresponds to another Ethernet interface of the network switch. After the network switch is connected to a network, an RX of the MAC 1 may be used to receive data sent by a first peer device. After the network switch performs processing on the received data, a TX of the MAC 2 may be used to send processed data to a second peer device. The MAC 1 may be used to implement the MAC in FIG. 2. Specifically, the MAC 1 may be used to execute the method shown in FIG. 2.

Referring to FIG. 2a, after the MAC 1 receives first data through a first channel and receives second data through a second channel, the MAC 1 may obtain multiple Ethernet frames according to the method provided in FIG. 2. Before the MAC 1 sends the multiple Ethernet frames to the NP 1, the MAC 1 may search a Media Access Control table for an entry that matches a value of a destination MAC address of the multiple Ethernet frames, where the entry includes an identifier of an outbound interface, and the outbound interface corresponds to the TX of the MAC 2. The MAC 1 sends the multiple Ethernet frames and the identifier of the outbound interface to the NP 1 or the TM 1. After the NP 1 or the TM 1 receives the multiple Ethernet frames and the identifier of the outbound interface, the NP 1 or the TM 1 may determine, based on the identifier of the outbound interface, that an operation (by the NP 1) of searching the Media Access Control table performed for the multiple Ethernet frames or an operation (by the TM 1) of traffic management performed for the multiple Ethernet frames is avoided. The NP 1 or the TM 1 sends the multiple Ethernet frames to the TX of the MAC 2, or the NP 1 or the TM 1 sends the multiple Ethernet frames and the identifier of the outbound interface to the FIC 1. After receiving the multiple Ethernet frames, the FIC 1 may process the multiple Ethernet frames into multiple cells in a switch fabric, and the FIC 1 sends the multiple cells in a switch fabric to the switch fabric.

In the solution shown in FIG. 2a, the NP 1 does not perform the operation of searching the Media Access Control table for the multiple Ethernet frames, and the TM 1 does not perform the operation of traffic management for the multiple Ethernet frames. Therefore, it is equivalent to bypassing the NP 1 and the TM 1 when the network switch performs processing on the multiple Ethernet frames. The foregoing solution reduces resources occupied by the NP 1 or the TM 1 and improves efficiency of processing the Ethernet frames.

For example, the network device may be a multi-port Ethernet device, and the first outbound interface may be an Ethernet interface. After receiving the at least one packet, the Ethernet interface may forward the at least one packet to a peer network device, and the peer network device may be a multi-port Ethernet device.

For example, the packet header of the at least one packet may be an outer packet header or an inner packet header of the at least one packet. For example, the at least one packet may be an Ethernet frame (English: Ethernet frame), an outer packet header of the Ethernet frame may be a frame header (frame header), and the inner packet header of the at least one packet may be an MPLS header, an IP header, or a TCP header.

For example, the information may be a value of a field of the packet header of the at least one packet, or may be a value of multiple fields. The multiple fields may be located in a same packet header, or may be located in different packet headers. For example, the information may be a value of a destination Media Access Control address in the frame header. Alternatively, the information may be a value of a source IP address and a value of a destination IP address in the IP header, and a value of a source Media Access Control address and a value of a destination Media Access Control address in the frame header.

Optionally, in the foregoing technical solution,
after that the first circuit sends the first packet to the $M^{th}$ packet to an aggregating circuit in the MAC, the method further includes:

searching, by a searching circuit in the aggregating circuit, a look-up table for an entry that matches information in a packet header of at least one packet of the first packet to the $M^{th}$ packet, to determine a first outbound interface that is used to forward the at least one packet, where the entry includes the information and an identifier the first outbound interface, the first outbound interface is an outbound interface of a network device, and the MAC is a component of the network device.

That the aggregating circuit sends the N packets specifically includes:

sending, by the aggregating circuit, the at least one packet to the first outbound interface.

For example, the aggregating circuit may send the at least one packet and the identifier of the first outbound interface to an NP or a TM. After the NP or the TM receives the at least one packet and the identifier of the first outbound interface, the NP or the TM may determine, based on the identifier of the first outbound interface, that an operation (by the NP) of searching a forwarding table performed for the at least one packet or an operation (by the TM) of traffic management performed for the at least one packet is avoided. The NP or the TM sends the at least one packet to the first outbound interface, or the NP or the TM sends the at least one packet and the identifier of the first outbound interface to a FIC. After receiving the at least one packet, the FIC may process the at least one packet into multiple cells in a switch fabric.

In the foregoing technical solution, after receiving the at least one packet, the NP or the TM does not perform the operation (by the NP) of searching a forwarding table or the operation (by the TM) of traffic management for the at least one packet. In the prior art, after receiving the packet, the NP or the TM needs to perform the operation of searching a forwarding table or perform the operation of traffic management for the received packet. Therefore, the foregoing technical solution is equivalent to bypassing the NP or the TM, which helps reduce resources occupied by the NP or the TM and improves packet processing efficiency.

For example, the network device may be a multi-port Ethernet device, and the first outbound interface may be an Ethernet interface.

For example, the packet header of the at least one packet may be an outer packet header or an inner packet header of the at least one packet. For example, the at least one packet may be an ethernet frame, an outer packet header of the Ethernet frame may be a frame header, and the inner packet header of the at least one packet may be an MPLS header, an IP header, or a TCP header.

For example, the information may be a value of a field of the packet header of the at least one packet, or may be a value of multiple fields. The multiple fields may be located in a same packet header, or may be located in different packet headers. For example, the information may be a value of a destination Media Access Control address in the frame header. Alternatively, the information may be a value of a source IP address and a value of a destination IP address in the IP header, and a value of a source Media Access Control address and a value of a destination Media Access Control address in the frame header.

Figure 3:
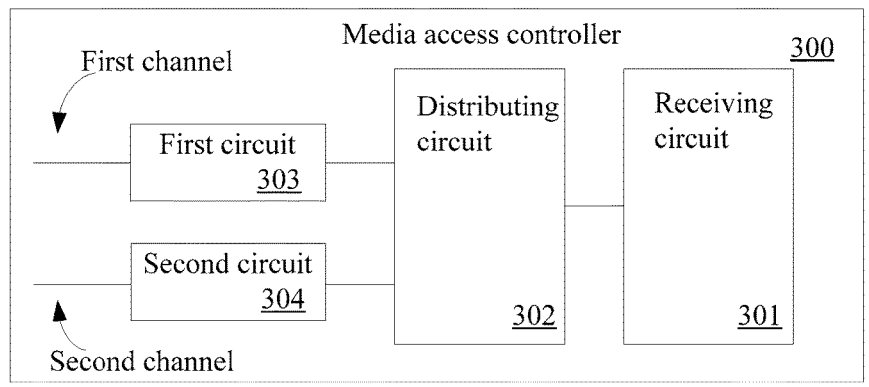
FIG. 3 is a schematic structural diagram of a media access controller according to an embodiment of the present invention.

FIG. 3 is a schematic structural diagram of a MAC 300 according to an embodiment of the present invention. The MAC 300 may be an entity of a MAC sublayer shown in FIG. 1, the MAC 300 may be a MAC chip, a system chip, or a multi-port Ethernet device, and the MAC 300 may be used to execute the method shown in FIG. 1a. For definitions and examples of terms involved in this embodiment, refer to the description of the embodiment corresponding to FIG. 1a. Details are not described herein again.

Referring to FIG. 3, the MAC 300 includes a receiving circuit 301, a distributing circuit 302, a first circuit 303, and a second circuit 304.

It may be understood that, the receiving circuit 301, the distributing circuit 302, the first circuit 303, and the second circuit 304 are functional circuits in the MAC 300. The foregoing functional circuits may be implemented by using an ASIC or an FPGA.

The receiving circuit 301 is configured to receive N packets, where the N packets sequentially arrive at the MAC 300 in a time sequence from the first packet to the $N^{th}$ packet, and N is a positive integer greater than 1.

The distributing circuit 302 is configured to generate a first data block and a second data block, where the first data block includes a first set, the first set includes the first packet to the $M^{th}$ packet, and the first packet to the $M^{th}$ packet are sequentially carried in the first data block in a location sequence from the first packet to the $M^{th}$ packet; the second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block includes a first identifier, the second data block includes a second identifier, the first identifier is used to indicate a time sequence that the first set arrives at the MAC 300, the second identifier is used to indicate a time sequence that the second set arrives at the MAC 300, M is a positive integer, and M is less than N.

The distributing circuit 302 is further configured to distribute the first data block to the first circuit 303 and distribute the second data block to the second circuit 304.

The first circuit 303 is configured to convert the first data block into first data.

The second circuit 304 is configured to convert the second data block into second data.

The first circuit 303 is further configured to send the first data through a first channel.

The second circuit 304 is further configured to send the second data through a second channel.

Optionally, in the foregoing technical solution, the first identifier is carried in an Ethernet IPG, a packet header of a packet, or a payload of a packet.

Optionally, in the foregoing technical solution, the second identifier is carried in an Ethernet IPG, a packet header of a packet, or a payload of a packet.

Optionally, in the foregoing technical solution, the MAC 300 further includes a comparing circuit.

The comparing circuit is configured to: before the distributing circuit 302 distributes the first data block to the first circuit 303 in the MAC 300, compare a length of a queue in a transmit buffer of the first circuit 303 with a length of a queue in a transmit buffer of the second circuit 304; and determine that the length of the queue in the transmit buffer of the first circuit 303 is less than or equal to the length of the queue in the transmit buffer of the second circuit 304.

The distributing circuit 302 is specifically configured to distribute the first data block to the first circuit 303 in the MAC 300 based on determining by the comparing circuit that the length of the queue in the transmit buffer of the first circuit 303 is less than or equal to the length of the queue in the transmit buffer of the second circuit 304.

It may be understood that the comparing circuit may be a functional circuit in the MAC.

Optionally, in the foregoing technical solution, the comparing circuit is further configured to: after the distributing circuit 302 distributes the first data block to the first circuit 303 in the MAC 300, and before the distributing circuit 302 distributes the second data block to the second circuit 304 in the MAC 300, compare the length of the queue in the transmit buffer of the first circuit 303 with the length of the queue in the transmit buffer of the second circuit 304; and determine that the length of the queue in the transmit buffer of the second circuit 304 is less than or equal to the length of the queue in the transmit buffer of the first circuit 303.

The distributing circuit 302 is specifically configured to distribute the second data block to the second circuit 304 in the MAC 300 based on determining by the comparing circuit that the length of the queue in the transmit buffer of the second circuit 304 is less than or equal to the length of the queue in the transmit buffer of the first circuit 303.

Optionally, in the foregoing technical solution, a difference between a maximum length of the first data block and a minimum length of the first data block is greater than or equal to a maximum length of a packet that can be received by the MAC 300.

Optionally, in the foregoing technical solution, a difference between a maximum length of the second data block and a minimum length of the second data block is greater than or equal to a maximum length of a packet that can be received by the MAC 300.

Figure 4:
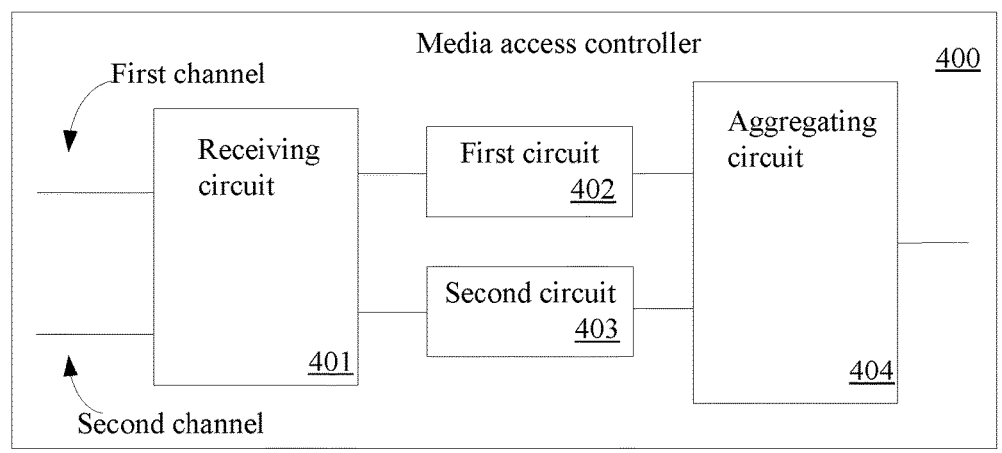
FIG. 4 is a schematic structural diagram of a media access controller according to an embodiment of the present invention.

FIG. 4 is a schematic structural diagram of a MAC 400 according to an embodiment of the present invention. The MAC 400 may be a MAC chip, a system chip, or a multi-port Ethernet device. For the MAC chip, the system chip, and the multi-port Ethernet device, refer to the description of the embodiment shown in FIG. 2. It should be noted that the MAC 300 in the embodiment shown in FIG. 3 may be a transmit MAC, and the MAC 400 in the embodiment shown in FIG. 4 may be a receive MAC. The transmit MAC and the receive MAC may form a data transmitting and receiving system. Specifically, the receive MAC may be used to receive data sent by the transmit MAC, and the MAC 400 may be used to execute the method shown in FIG. 2. For definitions and examples of terms involved in this embodiment, refer to the description of the embodiment corresponding to FIG. 2. Details are not described herein again.

Referring to FIG. 4, the MAC 400 includes a receiving circuit 401, a first circuit 402, a second circuit 403, and an aggregating circuit 404.

It may be understood that, the receiving circuit 401, the first circuit 402, the second circuit 403 and the aggregating circuit 404 may be functional circuits in the MAC 400. The foregoing functional circuits may be implemented by using an ASIC or an FPGA.

The receiving circuit 401 is configured to receive first data through a first channel and receive second data through a second channel.

The receiving circuit 401 is further configured to send the first data to the first circuit 402 and send the second data to the second circuit 403.

The first circuit 402 is configured to convert the first data into a first data block, where the first data block includes a first set, the first set includes the first packet to the $M^{th}$ packet, and the first packet to the $M^{th}$ packet are sequentially carried in the first data block in a location sequence from the first packet to the $M^{th}$ packet; the first data block includes a first identifier, and the first identifier is used to indicate a time sequence that a peer MAC generates the first data block.

For example, the peer MAC may be the MAC 300 shown in FIG. 3.

The second circuit 403 is configured to convert the second data into a second data block, where the second data block includes a second set, the second set includes the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the second data block includes a second identifier, the second identifier is used to indicate a time sequence that the peer MAC generates the second data block, M is a positive integer, M is less than N, and N is a positive integer greater than 1.

The first circuit 402 is further configured to generate the first packet to the $M^{th}$ packet according to the first data block.

The second circuit 403 is further configured to generate the $(M+1)^{th}$ packet to the $N^{th}$ packet according to the second data block.

The first circuit 402 is further configured to send the first packet to the $M^{th}$ packet to the aggregating circuit 404.

The second circuit 403 is further configured to send the $(M+1)^{th}$ packet to the $N^{th}$ packet to the aggregating circuit 404.

The aggregating circuit 404 is configured to send the N packets, where the aggregating circuit 404 sequentially sends the N packets in a time sequence from the first packet to the $N^{th}$ packet.

Optionally, in the foregoing technical solution, the first identifier is carried in an Ethernet frame IPG a packet header of a packet, or a payload of a packet.

Optionally, in the foregoing technical solution, the second identifier is carried in an Ethernet frame IPG a packet header of a packet, or a payload of a packet.

Optionally, in the foregoing technical solution, a difference between a maximum length of the first data block and a minimum length of the first data block is greater than or equal to a maximum length of a packet that can be generated by the MAC 400.

Optionally, in the foregoing technical solution, a difference between a maximum length of the second data block and a minimum length of the second data block is greater than or equal to a maximum length of a packet that can be generated by the MAC 400.

Optionally, in the foregoing technical solution, the MAC 400 further includes a searching circuit.

The searching circuit is configured to: after the first circuit 402 generates the first packet to the $M^{th}$ packet according to the first data block, and before the first circuit 402 sends the first packet to the $M^{th}$ packet to the aggregating circuit 404, search a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC 400 is a component of the network device.

The first circuit 402 is specifically configured to send the at least one packet and the identifier of the first outbound interface to the aggregating circuit 404.

It may be understood that the searching circuit may be specifically a functional circuit in the MAC 400.

Alternatively, in the foregoing technical solution, the aggregating circuit 404 further includes a searching circuit.

The searching circuit is configured to: after the first circuit 402 sends the first packet to the $M^{th}$ packet to the aggregating circuit 404, search a look-up table for an entry that matches information in a packet header of at least one packet of the first packet to the $M^{th}$ packet, to determine a first outbound interface that is used to forward the at least one packet, where the entry includes the information and an identifier of the first outbound interface, the first outbound interface is an outbound interface of a network device, and the MAC 400 is a component of the network device.

The aggregating circuit 404 is specifically configured to send the at least one packet to the first outbound interface.

It may be understood that the searching circuit may be specifically a functional circuit in the MAC 400.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division may merely be logical function division and may be other division in actual implementation. For example, a plurality of units or parts may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to actual requirements to achieve the purposes of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
receiving, by a receiving circuit in a media access controller (MAC), N packets, wherein the N packets sequentially arrive at the MAC in a time sequence from the first packet to the $N^{th}$ packet, and N is a positive integer greater than 1;
generating, by a distributing circuit in the MAC, a first data block and a second data block, wherein the first data block comprises a first set, the first set comprises the first packet to the $M^{th}$ packet, and the first packet to the $M^{th}$ packet are sequentially carried in the first data block in a location sequence from the first packet to the $M^{th}$ packet; the second data block comprises a second set, the second set comprises the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block comprises a first identifier, the second data block comprises a second identifier, the first identifier is used to indicate a time sequence that the first set arrives at the MAC, the second identifier is used to indicate a time sequence that the second set arrives at the MAC, M is a positive integer, and M is less than N;
distributing, by the distributing circuit, the first data block to a first circuit in the MAC, and distributing, by the distributing circuit, the second data block to a second circuit in the MAC;
converting, by the first circuit, the first data block into first data, and converting, by the second circuit, the second data block into second data; and
sending, by the first circuit, the first data through a first channel, and sending, by the second circuit, the second data through a second channel.

2. The method according to claim 1, wherein:
the first identifier is carried in an Ethernet interpacket gap IPG, a packet header of a packet, or a payload of a packet; or
the second identifier is carried in an Ethernet interpacket gap IPG, a packet header of a packet, or a payload of a packet.

3. The method according to claim 1, wherein:
before the distributing, by the distributing circuit, the first data block to a first circuit in the MAC, the method further comprises:
comparing, by a comparing circuit in the MAC, a length of a queue in a transmit buffer of the first circuit with a length of a queue in a transmit buffer of the second circuit; and
determining, by the comparing circuit, that the length of the queue in the transmit buffer of the first circuit is less than or equal to the length of the queue in the transmit buffer of the second circuit; and
the distributing, by the distributing circuit, the first data block to a first circuit in the MAC specifically comprises:
distributing, by the distributing circuit, the first data block to the first circuit in the MAC based on determining by the comparing circuit that the length of the queue in the transmit buffer of the first circuit is less than or equal to the length of the queue in the transmit buffer of the second circuit.

4. The method according to claim 3, wherein:
after the distributing, by the distributing circuit, the first data block to a first circuit in the MAC, and before the distributing, by the distributing circuit, the second data block to a second circuit in the MAC, the method further comprises:
comparing, by the comparing circuit, the length of the queue in the transmit buffer of the first circuit with the length of the queue in the transmit buffer of the second circuit; and
determining, by the comparing circuit, that the length of the queue in the transmit buffer of the second circuit is less than or equal to the length of the queue in the transmit buffer of the first circuit; and
the distributing, by the distributing circuit, the second data block to a second circuit in the MAC specifically comprises:
distributing, by the distributing circuit, the second data block to the second circuit in the MAC based on determining by the comparing circuit that the length of the queue in the transmit buffer of the second circuit is less than or equal to the length of the queue in the transmit buffer of the first circuit.

5. The method according to claim 1, wherein:
a difference between a maximum length of the first data block and a minimum length of the first data block is greater than or equal to a maximum length of a packet that can be received by the MAC; or
a difference between a maximum length of the second data block and a minimum length of the second data block is greater than or equal to a maximum length of a packet that can be received by the MAC.

6. A data transmission method, comprising:
receiving, by a receiving circuit in a media access controller (MAC), first data through a first channel, and receiving, by the receiving circuit, second data through a second channel;

sending, by the receiving circuit, the first data to a first circuit in the MAC, and sending, by the receiving circuit, the second data to a second circuit in the MAC;

converting, by the first circuit, the first data into a first data block, and converting, by the second circuit, the second data into a second data block, wherein the first data block comprises a first set, the first set comprises the first packet to the $M^{th}$ packet, and the first packet to the $M^{th}$ packet are sequentially carried in the first data block in a location sequence from the first packet to the $M^{th}$ packet; the second data block comprises a second set, the second set comprises the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block comprises a first identifier, the second data block comprises a second identifier, the first identifier is used to indicate a time sequence that a peer MAC generates the first data block, the second identifier is used to indicate a time sequence that the peer MAC generates the second data block, M is a positive integer, M is less than N, and N is a positive integer greater than 1;

generating, by the first circuit, the first packet to the $M^{th}$ packet according to the first data block, and generating, by the second circuit, the $(M+1)^{th}$ packet to the $N^{th}$ packet according to the second data block;

sending, by the first circuit, the first packet to the $M^{th}$ packet to an aggregating circuit in the MAC;

sending, by the second circuit, the $(M+1)^{th}$ packet to the $N^{th}$ packet to the aggregating circuit; and sequentially sending, by the aggregating circuit, the N packets in a time sequence from the first packet to the $N^{th}$ packet.

7. The method according to claim 6, wherein:
the first identifier is carried in an Ethernet interpacket gap IPG, a packet header of a packet, or a payload of a packet; or
the second identifier is carried in an Ethernet interpacket gap IPG, a packet header of a packet, or a payload of a packet.

8. The method according to claim 6, wherein:
a difference between a maximum length of the first data block and a minimum length of the first data block is greater than or equal to a maximum length of a packet that can be generated by the MAC; or
a difference between a maximum length of the second data block and a minimum length of the second data block is greater than or equal to a maximum length of a packet that can be generated by the MAC.

9. The method according to claim 6, wherein:
after the generating, by the first circuit, the first packet to the $M^{th}$ packet according to the first data block, and before the sending, by the first circuit, the first packet to the $M^{th}$ packet to an aggregating circuit in the MAC, the method further comprises:
searching, by a searching circuit in the MAC, a look-up table for an entry that matches information in a packet header of at least one packet of the first packet to the $M^{th}$ packet, to determine a first outbound interface that is used to forward the at least one packet, wherein the entry comprises the information and an identifier of the first outbound interface, the first outbound interface is an outbound interface of a network device, and the MAC is a component of the network device; and the sending, by the first circuit, the first packet to the $M^{th}$ packet to an aggregating circuit in the MAC specifically comprises:
sending, by the first circuit, the at least one packet and the identifier of the first outbound interface to the aggregating circuit.

10. The method according to claim 6, wherein:
after the sending, by the first circuit, the first packet to the $M^{th}$ packet to an aggregating circuit in the MAC, the method further comprises:
searching, by a searching circuit in the aggregating circuit, a look-up table for an entry that matches information in a packet header of at least one packet of the first packet to the $M^{th}$ packet, to determine a first outbound interface that is used to forward the at least one packet, wherein the entry comprises the information and an identifier of the first outbound interface, the first outbound interface is an outbound interface of a network device, and the MAC is a component of the network device; and
the sending, by the aggregating circuit, the N packets specifically comprises:
sending, by the aggregating circuit, the at least one packet to the first outbound interface.

11. A media access controller (MAC), comprising a receiving circuit, a distributing circuit, a first circuit, and a second circuit; wherein:
the receiving circuit is configured to receive N packets, wherein the N packets sequentially arrive at the MAC in a time sequence from the first packet to the $N^{th}$ packet, and N is a positive integer greater than 1;
the distributing circuit is configured to generate a first data block and a second data block, wherein the first data block comprises a first set, the first set comprises the first packet to the $M^{th}$ packet, and the first packet to the $M^{th}$ packet are sequentially carried in the first data block in a location sequence from the first packet to the $M^{th}$ packet; the second data block comprises a second set, the second set comprises the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the first data block comprises a first identifier, the second data block comprises a second identifier, the first identifier is used to indicate a time sequence that the first set arrives at the MAC, the second identifier is used to indicate a time sequence that the second set arrives at the MAC, M is a positive integer, and M is less than N;
the distributing circuit is further configured to distribute the first data block to the first circuit and distribute the second data block to the second circuit;
the first circuit is configured to convert the first data block into first data;
the second circuit is configured to convert the second data block into second data;
the first circuit is further configured to send the first data through a first channel; and
the second circuit is further configured to send the second data through a second channel.

12. The MAC according to claim 11, wherein:
the first identifier is carried in an Ethernet interpacket gap IPG, a packet header of a packet, or a payload of a packet; or
the second identifier is carried in an Ethernet interpacket gap IPG, a packet header of a packet, or a payload of a packet.

13. The MAC according to claim 11, wherein the MAC further comprises a comparing circuit, wherein:
the comparing circuit is configured to: before the distributing circuit distributes the first data block to the first circuit in the MAC, compare a length of a queue in a transmit buffer of the first circuit with a length of a queue in a transmit buffer of the second circuit; and determine that the length of the queue in the transmit buffer of the first circuit is less than or equal to the length of the queue in the transmit buffer of the second circuit; and
the distributing circuit is specifically configured to distribute the first data block to the first circuit in the MAC based on determining by the comparing circuit that the length of the queue in the transmit buffer of the first circuit is less than or equal to the length of the queue in the transmit buffer of the second circuit.

14. The MAC according to claim 13, wherein:
the comparing circuit is further configured to: after the distributing circuit distributes the first data block to the first circuit in the MAC, and before the distributing circuit distributes the second data block to the second circuit in the MAC, compare the length of the queue in the transmit buffer of the first circuit with the length of the queue in the transmit buffer of the second circuit; and determine that the length of the queue in the transmit buffer of the second circuit is less than or equal to the length of the queue in the transmit buffer of the first circuit; and
the distributing circuit is specifically configured to distribute the second data block to the second circuit in the MAC based on determining by the comparing circuit that the length of the queue in the transmit buffer of the second circuit is less than or equal to the length of the queue in the transmit buffer of the first circuit.

15. The MAC according to claim 11, wherein:
a difference between a maximum length of the first data block and a minimum length of the first data block is greater than or equal to a maximum length of a packet that can be received by the MAC; or
a difference between a maximum length of the second data block and a minimum length of the second data block is greater than or equal to a maximum length of a packet that can be received by the MAC.

16. A media access controller (MAC), comprising a receiving circuit, a first circuit, a second circuit, and an aggregating circuit; wherein:
the receiving circuit is configured to receive first data through a first channel and receive second data through a second channel;
the receiving circuit is further configured to send the first data to the first circuit and send the second data to the second circuit;
the first circuit is configured to convert the first data into a first data block, wherein the first data block comprises a first set, the first set comprises the first packet to the $M^{th}$ packet, and the first packet to the $M^{th}$ packet are sequentially carried in the first data block in a location sequence from the first packet to the $M^{th}$ packet; the first data block comprises a first identifier, and the first identifier is used to indicate a time sequence that a peer MAC generates the first data block;
the second circuit is configured to convert the second data into a second data block, wherein the second data block comprises a second set, the second set comprises the $(M+1)^{th}$ packet to the $N^{th}$ packet, and the $(M+1)^{th}$ packet to the $N^{th}$ packet are sequentially carried in the second data block in a location sequence from the $(M+1)^{th}$ packet to the $N^{th}$ packet; the second data block comprises a second identifier, and the second identifier is used to indicate a time sequence that the peer MAC generates the second data block, M is a positive integer, M is less than N, and N is a positive integer greater than 1;
the first circuit is further configured to generate the first packet to the $M^{th}$ packet according to the first data block;
the second circuit is further configured to generate the $(M+1)^{th}$ packet to the $N^{th}$ packet according to the second data block;
the first circuit is further configured to send the first packet to the $M^{th}$ packet to the aggregating circuit;
the second circuit is further configured to send the $(M+1)^{th}$ packet to the $N^{th}$ packet to the aggregating circuit; and
the aggregating circuit is configured to sequentially send the N packets in a time sequence from the first packet to the $N^{th}$ packet.

17. The MAC according to claim 16, wherein:
the first identifier is carried in an Ethernet interpacket gap IPG, a packet header of a packet, or a payload of a packet; or
the second identifier is carried in an Ethernet interpacket gap IPG, a packet header of a packet, or a payload of a packet.

18. The MAC according to claim 16, wherein:
a difference between a maximum length of the first data block and a minimum length of the first data block is greater than or equal to a maximum length of a packet that can be generated by the MAC; or
a difference between a maximum length of the second data block and a minimum length of the second data block is greater than or equal to a maximum length of a packet that can be generated by the MAC.

19. The MAC according to claim 16, wherein the MAC further comprises a searching circuit, wherein:
the searching circuit is configured to: after the first circuit generates the first packet to the $M^{th}$ packet according to the first data block, and before the first circuit sends the first packet to the $M^{th}$ packet to the aggregating circuit, search a look-up table for an entry that matches information in a packet header of at least one packet of the first packet to the $M^{th}$ packet, to determine a first outbound interface that is used to forward the at least one packet, wherein the entry comprises the information and an identifier of the first outbound interface, the first outbound interface is an outbound interface of a network device, and the MAC is a component of the network device; and
the first circuit is specifically configured to send the at least one packet and the identifier of the first outbound interface to the aggregating circuit.

20. The MAC according to claim 16, wherein the aggregating circuit further comprises a searching circuit, wherein
the searching circuit is configured to: after the first circuit sends the first packet to the $M^{th}$ packet to the aggregating circuit, search a look-up table for an entry that matches information in a packet header of at least one packet of the first packet to the $M^{th}$ packet, to determine a first outbound interface that is used to forward the at least one packet, wherein the entry comprises the information and an identifier of the first outbound interface, the first outbound interface is an outbound interface of a network device, and the MAC is a component of the network device; and the aggregating circuit is specifically configured to send the at least one packet to the first outbound interface.

* * * * *